(12) United States Patent
Surapaneni et al.

(10) Patent No.: US 9,088,919 B2
(45) Date of Patent: Jul. 21, 2015

(54) METHOD AND APPARATUS FOR EXPEDITED WIRELESS DEVICE HANDOVER

(71) Applicant: QUALCOMM Incorporated, San Diego, CA (US)

(72) Inventors: Rakesh Surapaneni, Hyderabad (IN); Krishna Chaitanya Mukkera, San Diego, CA (US); Ansah Ahmed Sheik, Hyderabad (IN); Hemanth Kumar Rayapati, San Diego, CA (US); Ravi Gopalan, San Diego, CA (US); Valibabu Saladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 13/782,994

(22) Filed: Mar. 1, 2013

(65) Prior Publication Data
US 2013/0273915 A1   Oct. 17, 2013

Related U.S. Application Data

(60) Provisional application No. 61/624,076, filed on Apr. 13, 2012.

(51) Int. Cl.
*H04W 36/00* (2009.01)
*H04W 4/00* (2009.01)
*H04B 1/7083* (2011.01)

(52) U.S. Cl.
CPC ......... *H04W 36/0072* (2013.01); *H04B 1/7083* (2013.01); *H04W 36/0016* (2013.01)

(58) Field of Classification Search
USPC ............................ 455/536–444; 370/331–333
See application file for complete search history.

(56) References Cited

U.S. PATENT DOCUMENTS 7,012,906 B1   3/2006 Song
7,911,965 B2   3/2011 Bergstrom et al.
(Continued)

FOREIGN PATENT DOCUMENTS

WO   03088527 A1   10/2003

OTHER PUBLICATIONS

ETSI TS 125 402 V3.1.0 release 1999, (Mar. 2000), Universal Mobile Telecommunications System (UTMS).*

(Continued)

*Primary Examiner* — Omoniyi Obayanju
(74) *Attorney, Agent, or Firm* — Charles Chesney (57) ABSTRACT

The present disclosure presents a method and apparatus for expedited mobile device handover that include performing one or more handover tasks in parallel that have previously been performed exclusively in serial. For example, the disclosure presents a method for wireless device handover, which may include acquiring a target cell, ascertaining a system frame number (SFN) of the target cell, calculating a connection frame number (CFN) for a dedicated channel (DCH) transmission, and reconfiguring a dedicated physical channel (DPCH) based on the calculated CFN. In addition, such an example method may include, while performing at least one of the ascertaining of the SFN, the calculating of the CFN, and the reconfiguring of the DPCH, contemporaneously performing at least one of establishing a downlink dedicated physical channel (DL-DPCH), establishing a synchronization with the target cell, and establishing an uplink dedicated physical channel (UL-DPCH) subsequent to the downlink synchronization.

30 Claims, 7 Drawing Sheets

(56) References Cited

U.S. PATENT DOCUMENTS

| | | | |
|---|---|---|---|
| 2007/0129075 A1* | 6/2007 | Kim et al. | 455/436 |
| 2008/0267131 A1 | 10/2008 | Kangude et al. | |
| 2010/0080192 A1 | 4/2010 | Dong et al. | |
| 2011/0007856 A1 | 1/2011 | Jang et al. | |
| 2011/0292911 A1 | 12/2011 | Uemura et al. | |
| 2012/0196603 A1 | 8/2012 | Mochizuki et al. | |

OTHER PUBLICATIONS

3GPP 3GPP TS 25.214 V10.6.0, (Mar. 2012), 3rd Generation Partnership Project.*

International Search Report and Written Opinion—PCT/US2013/036310—ISAEPO—Sep. 3, 2013.

* cited by examiner

METHOD AND APPARATUS FOR EXPEDITED WIRELESS DEVICE HANDOVER

CLAIM OF PRIORITY UNDER 45 U.S.C. §119

The present Application for patent claims priority to Provisional Application No. 61/624,076 filed Apr. 13, 2012, entitled "Method and Apparatus for Expedited Wireless Device Handover," which is assigned to the assignee hereof, and hereby expressly incorporated by reference herein.

BACKGROUND

1. Field

Aspects of the present disclosure relate generally to wireless communication systems, and more particularly, to call handover in wireless communication environments.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In legacy wireless systems, a user equipment (UE) and/or one or more network devices may be configured to handover a call of the UE from a serving cell to a target cell, for example, when signal quality associated with the serving cell becomes degraded. To successfully perform a handover operation between cells, signal timing between the UE and the target cell must first be synchronized. Furthermore, one parameter that is relevant to the signal synchronization process is the unique system frame number (SFN) associated with the target cell, which is a cell-level synchronization parameter that coordinates signal timing between network entities in the target cell and the UEs that these network entities serve. The SFN is also used for establishment of a dedicated physical channel (DCH) between the UE and a target cell during handover. In some handover scenarios, however, UEs are initially unaware of the SFN associated with a target cell before handover operations commence and must demodulate and process a target cell primary common control physical channel (P-CCPCH) to decipher the target cell SFN in order to proceed with the handover.

One such scenario in which a UE may be initially unaware of a target cell SFN may be in inter-radio access technology (RAT) handover. For example, in some wireless communications environments, multiple cells utilizing different RATs may exist, such as those conforming to technology standards such as Long Term Evolution (LTE), Global System for Mobile Communications (GSM) (e.g. Enhanced Data Rates for GSM Evolution (EDGE) and/or Global Packet Radio Service (GPRS)), or WCDMA. Though UEs operating in such wireless communication environments may prefer to utilize cells associated with one of these RATs relative to other RATs, the UE may be programmed to hand service over to a cell utilizing a different RAT where the service associated with the preferred RAT becomes degraded. For example, some UEs are configured to utilize 4G or GSM cells when possible, but may be handed over to a cell utilizing WCDMA where the 4G or GSM service deteriorates. Such inter-RAT handover may preserve an ongoing call where the preferred RAT can no longer maintain the call. The UE, however, is not initially aware of the SFN of the target cell, and therefore must demodulate and process the target cell P-CCPCH to decipher the SFN in order to correctly establish a DPCH and otherwise proceed with the handover.

Furthermore, UEs may also be unaware of a target cell SFN in certain handover scenarios involving a serving cell and a target cell that utilize the same RAT. For example, where the UE is in a connected state (e.g. CELL_FACH) on a first frequency on a source cell utilizing WCDMA and the network requires the UE to move to dedicated mode (e.g. CELL_DCH) on a second frequency on a target cell also utilizing WCDMA, the UE may be initially unaware of the SFN associated with the target cell. Again, in this intra-RAT handover scenario, the UE must first receive, demodulate, and process the target cell P-CCPCH to obtain the SFN before it can establish the required DPCH with the target cell.

Therefore, in these and other handover scenarios wherein the UE is unaware of the target cell SFN before initiation of handover procedures, the UE must determine the SFN of the target cell and use at least this SFN to establish a DCCH with the target cell. In legacy devices and systems, these and other handover operations are performed in series. For example, the UE may acquire the WCDMA cell, decode the SFN associated with the cell by detecting and decoding the P-CCPCH transmitted by the cell, compute the connection frame number (CFN) from the SFN, establish a downlink dedicated physical channel (DL-DPCH), perform a synchronization procedure (e.g. SyncA procedure), and establish an uplink dedicated physical channel (UL-DPCH)—performing all of these operations in a linear sequence.

Recently, consumer and network operator demand for faster and more reliable cell handover has increased significantly. Performing the foregoing handover operations according to current procedures limits the ability for networks and UEs to meet these handover time demands. Therefore, method and apparatus for increasing the efficiency of handover are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents example method and apparatus for improved and expedited wireless device handover.

For example, the present disclosure presents an example method for expedited wireless device handover that includes acquiring a target cell, ascertaining a system frame number (SFN) of the target cell, calculating a connection frame number (CFN) for a dedicated channel (DCH) transmission, and reconfiguring a dedicated physical channel (DPCH) based on the calculated CFN. In addition, such an example method may include, while performing at least one of the ascertaining of the SFN, the calculating of the CFN, and the reconfiguring of the DPCH, contemporaneously performing at least one of establishing a downlink dedicated physical channel (DL-DPCH), establishing a synchronization with the target cell, and establishing an uplink dedicated physical channel (UL-DPCH) subsequent to the downlink synchronization.

In an additional aspect, the present disclosure presents an example apparatus for wireless communication, which may include means for acquiring a target cell, means for ascertaining a system frame number of the target cell, means for calculating a connection frame number for a dedicated channel transmission, and means for reconfiguring a dedicated physical channel based on the calculated CFN. In addition, such apparatuses may include means for contemporaneously performing, while performing at least one of the ascertaining of the SFN, the calculating of the CFN, and the reconfiguring of the DPCH, at least one of establishing a downlink dedicated physical channel, establishing a synchronization with the target cell, and establishing an uplink dedicated physical channel subsequent to the downlink synchronization.

Moreover, the present disclosure presents an example computer program product, which may include a computer-readable medium comprising code for acquiring a target cell, code for ascertaining a system frame number of the target cell, and code for calculating a connection frame number for a dedicated channel transmission. Additionally, the example computer program product may further include code for reconfiguring a dedicated physical channel based on the calculated CFN, said code, while executing at least one of the code for ascertaining of the SFN, the code for calculating of the CFN, and the code for reconfiguring of the DPCH, contemporaneously executing code for at least one of establishing a downlink dedicated physical channel, establishing a synchronization with the target cell, and establishing an uplink dedicated physical channel subsequent to the downlink synchronization.

In a further aspect, the present disclosure presents an apparatus for wireless communication, including at least one processor and a memory coupled to the at least one processor, wherein the at least one processor is configured to acquire a target cell, ascertain a system frame number of the target cell, calculate a connection frame number for a dedicated channel transmission, and reconfigure a dedicated physical channel based on the calculated CFN. Furthermore, the apparatus may be configured to contemporaneously perform, while performing at least one of the ascertaining of the SFN, the calculating of the CFN, and the reconfiguring of the DPCH, at least one of establishing a downlink dedicated physical channel, establishing a synchronization with the target cell, and establishing an uplink dedicated physical channel subsequent to the downlink synchronization.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and apparatus for improved UE handover from non-WCDMA cells to WCDMA cells, or between WCDMA cells, in wireless environments. In particular, the described method and apparatus may be utilized in any handover scenario where a Dedicated Physical Channel (DPCH) needs to be set up (for purpose of transition into CELL_DCH) by the UE given the constraint that the UE is not aware of the SFN of the WCDMA cell on which the DPCH is to be setup. In an aspect of the disclosure, the UE may perform certain handover operations in parallel, or concurrently, which may reduce the amount of time required to perform handover procedures at the UE. As such, the UE may more quickly perform the processes for handover, e.g. from a non-WCDMA cell to a WCDMA cell, or between WCDMA cells, without sacrificing performance or session quality.

For example, in an aspect, the UE may use methods or algorithms to establish a DL-DPCH channel and/or perform synchronization operations (e.g. a SyncA procedure) while concurrently demodulating a P-CCPCH channel to determine a SFN, computing a CFN from at least the SFN, and/or reconfiguring the DL-DPCH. Using these methods or algorithms, the UE may reduce the time for handover of the UE.

Figure 1:
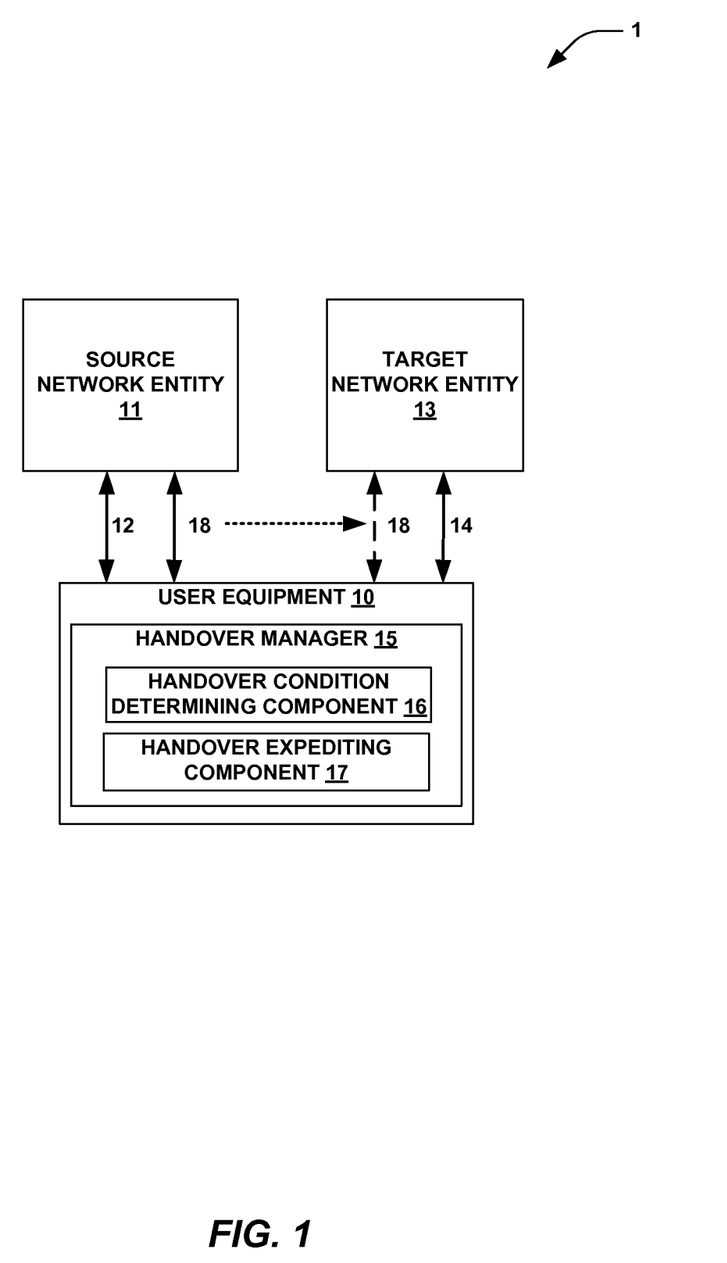
FIG. 1 is a block diagram illustrating an example wireless system include a user equipment configured for expedited handover from a source cell to a target cell of respective network entities according to aspects of the present disclosure.

Referring to FIG. 1, an aspect of a wireless communication system 1 is illustrated that may exhibit improved handover performance. System 1 includes a UE 10 that communicates with a source network entity 11 and a target network entity 13 via a first link 12 and a second link 14, respectively. In an aspect, UE 10 may engage in an active call 18 with source network entity 11 and may seek to handover the active call 18 to the target network entity 13. Additionally, source network entity 11 and target network entity 13 may include one or more of any type of network component, such as an access point, including a base station (BS) or node B, a relay, a peer-to-peer device, an authentication, authorization and accounting (AAA) server, a mobile switching center (MSC), etc., that can enable UE 10 to communicate and/or that can establish and maintain first data link 12, second data link 14, and/or active call 18.

In one non-limiting example aspect, the radio access technology (RAT) of source network entity 11 may be any RAT except WCDMA. By non-limiting example, the RAT of source network entity 11 may be LTE, GSM, EDGE, GPRS or any other network technology operable with UE 10 and that supports handover to target network entity 13. Additionally, in a non-limiting aspect, the RAT associated with target network entity 13 may be WCDMA. Alternatively, in an additional non-limiting example aspect, the RAT of source network entity 11 and the RAT of target network entity 13 both may be WCDMA. In other words, wireless communication system 1 may support both inter-RAT handover and intra-RAT handover, and more specifically non-WCDMA to WCDMA handover, and intra-WCDMA handover.

Furthermore, UE 10 may include a handover manager 15, which may be configured to monitor network conditions and/or network cell attributes and handover calls associated with UE 10 among network entities. For example, handover manager 15 may be configured to contemporaneously monitor a source cell, e.g. source network entity 11, and target cell, e.g. target network entity 13, and perform handover, such as expedited handover described herein, between network entities associated with the source cell and the target cell. As used herein, the terms source cell and target cell may be considered to refer to source network entity 11 and target network entity 13, respectively, and/or a cellular coverage area served by source network entity 11 and target network entity 13, respectively.

Additionally, handover manager 15 may include a handover condition determining component 16, which may be configured to monitor the signal strengths associated with a signal respectively transmitted by a serving cell, such as source network entity 11, and a target cell, such as target network entity 13. For example, in an aspect, handover condition determining component 16 may include or be in communication with a receiver and/or transceiver and corresponding receive chain components configured to receive a signal and measure a received signal strength. Further, for example, handover condition determining component 16 may be further configured to compare the received signal strength to one or more thresholds. In this case, handover condition determining component 16 may be further configured to interpret meeting or failing to meet a respective threshold as indicating or not indicating a handover condition in a serving cell, e.g. a sufficiently weak signal strength to warrant a handover, and/or a target cell having a signal sufficiently strong enough to warrant receiving a handover, and/or some combination of both. As such, handover condition determining component 16 may determine that, based on the respective monitored signal strengths, UE 10 should be handed over from the serving cell to the target cell. According to the aspects of the present disclosure, such a handover may include a soft handover, a softer handover, or a hard handover.

Furthermore, handover condition determining component 16 may determine that the UE should utilize the expedited handover procedures described herein based on the RAT of the target cell. For example, where the RAT associated with target cell is WCDMA, the handover condition determining component 16 may determine that the UE should utilize expedited handover procedures in handing the UE over to the target cell. In an additional aspect, handover condition determining component 16 may determine that the SFN of a target cell is unknown. In this instance, handover condition determining component 16 may determine that the UE and/or network entities should utilize expedited handover according to the present disclosure.

Handover manager 15 may additionally include a handover expediting component 17, which may be configured to expedite handover processes associated with a call handover where the UE is not initially aware of the target cell SFN. Specifically, handover expediting component 17 may perform one or more handover process steps associated with the handover in a parallel fashion. In other words, handover expediting component 17 may allow UE 10 to perform one or more handover operations contemporaneously to reduce handover time requirements.

Figure 2:
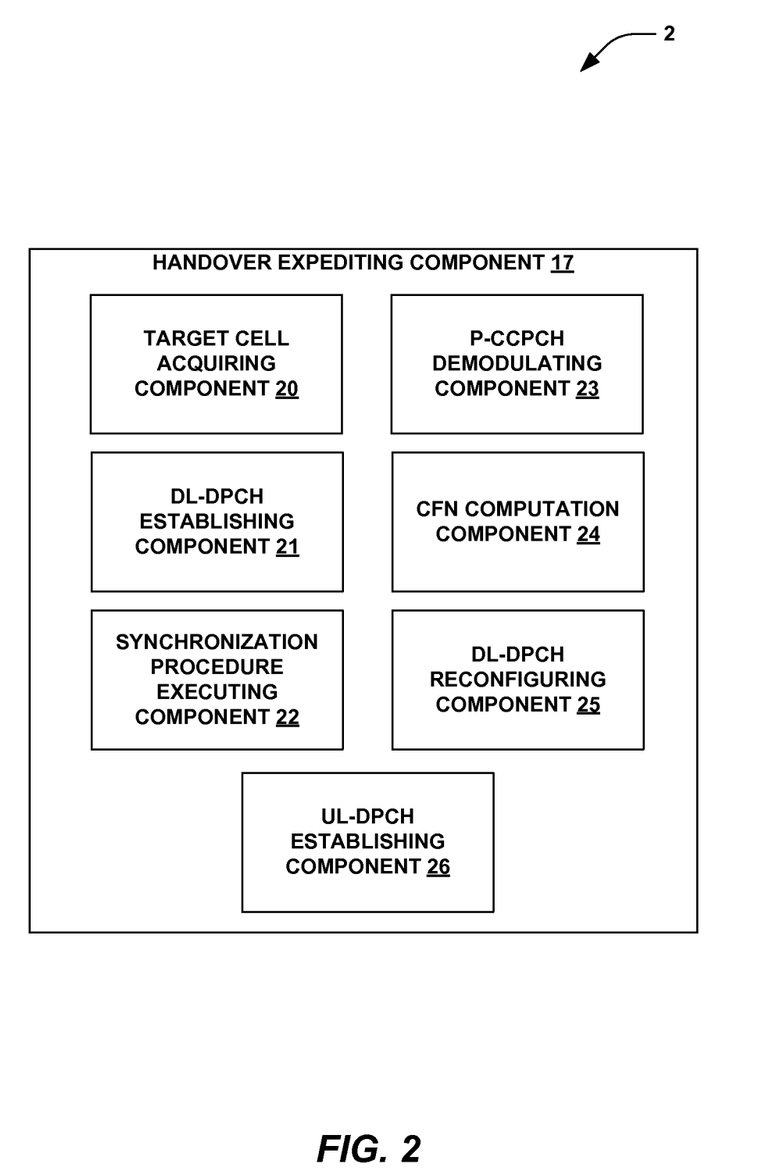
FIG. 2 is a block diagram illustrating an example handover expediting component according to aspects of the present disclosure.

Turning to FIG. 2, illustrated are handover expediting component 17 and various sub-components that may comprise handover expediting component 17. For example, in an aspect, handover expediting component 17 may include a target cell acquiring component 20 that may be configured to acquire a target cell, for example, when signal quality on a serving cell has degraded. In an aspect, target cell acquiring component 20 may decipher the position of the target cell with respect to the UE 10.

Additionally, handover expediting component 17 may include a downlink dedicated physical channel (DL-DPCH) establishing component 21, which may be configured to establish a DL-DPCH to allow the UE 10 to receive data from the target cell. In addition, the UE 10 may include a primary common control physical channel (P-CCPCH) demodulating component 23, which may be configured to detect, receive, and/or demodulate a P-CCPCH associated with the target cell. By demodulating the P-CCPCH, the UE 10 may decipher the system frame number (SFN) of the target cell, which may, for example, have a value of 0 to 4095, and serves as a cell-level synchronization parameter for the network. The target cell, e.g. target network entity 13, may broadcast the SFN in a Broadcast Control Channel (BCH), which is mapped onto the P-CCPCH and received by the UE 10.

Furthermore, the UE 10 may include a connection frame number (CFN) computation component 24, which may process the deciphered SFN to obtain the CFN. For example, the CFN may have a value of 0 to 255 and serves as a synchronization parameter for communication between the UE 10 and the target cell, e.g. target network entity 13. In a non-limiting aspect, CFN computation component 24 may calculate the CFN using the following algorithm:

$$CFN = SFN \text{ modulo } 256 - DOFF_{frames}$$

where $DOFF_{frames}$ is a parameter signaled by the network, e.g. target network entity 13, in an RRC Connection Setup message, which is transmitted by the network in response to an RRC Connection Request message transmitted by the UE 10, and has a value in 512 chip units having a frame component and a subframe component.

Furthermore, handover expediting component 17 may include a DL-DPCH reconfiguring component 25, which may compute a correct transmission time interval (TTI) for communication between the UE 10 and the network, e.g.

target network entity 13, and reconfigure DL-DPCH characteristics according to the SFN, CFN, and/or the correct TTI. In some wireless networks, such as WCDMA networks, the TTI refers to the duration of a transport channel, and may, for example, take values of 10, 20, 40, or 80 milliseconds. Using the correct TTI at the UE 10 is used to correct signal transmission and reception at the UE 10. Thus, once the CFN has been ascertained by CFN computation component 24, DL-DPCH reconfiguring component 25 can compute and apply the correct TTI for correct signal alignment.

By way of example, for a transport channel with a 40 millisecond TTI, the TTI comprises four 10 millisecond frames, while for a transport channel with an 80 millisecond TTI, the TTI comprises eight 10 millisecond frames. At any given point in time, the UE 10 may determine its current frame by utilizing the following algorithm:

$$TTI_{frame} = CFN \text{ modulo } TTI_{length \text{ in frames}}$$

Because a TTI may be up to 80 milliseconds and may therefore include up to eight 10 millisecond frames, $TTI_{frame}$ may take the value of any one of the set $[f_0, f_1, f_2, f_3, f_4, f_5, f_6, f_7]$. Also, $TTI_{length \text{ in frames}}$ may take the value of any of the set [1, 2, 4, 8].

Once the UE 10 has deciphered the SFN, CFN, and corrected TTI alignment, DL-DPCH reconfiguring component 25 may reconfigure the DL-DPCH according to the acquired SFN, CFN, and TTI alignment to ensure proper UE 10/network, e.g. target network entity 13, synchronization. In other words, the UE-side and network-side understanding of the starting point in time of a given TTI should be substantially congruent to ensure reliable communication.

In an additional aspect, handover expediting component 17 may include a synchronization procedure executing component 22, which may include and be configured to execute one or more synchronization procedures related to communication between the UE 10 and a target cell, e.g. target network entity 13. In an aspect, this synchronization procedure may be a Synchronization A (SyncA) procedure as defined in Technical Specification 25.214 published by the Third Generation Partnership Project (3GPP), hereby incorporated by reference herein. This SyncA procedure determines the correct synchronization parameters for the UE uplink to prepare the UE 10 for transmission of data to the target cell, e.g. target network entity 13.

Furthermore, once synchronization procedure executing component 22 performs such a procedure, an uplink dedicated physical channel (UL-DPCH) establishing component 26 included in handover expediting component 17 may establish a UP-DPCH between the UE 10 and the target network entity 13 serving the target cell.

In a further aspect of the present disclosure, two or more of the above-described components of handover expediting component 17 may perform their associated functions in parallel or, in other words, contemporaneously. By contemporaneously executing these handover functions, the UE 10 and/or handover expediting component 17 may reduce the time period to accomplish handover of call 18 from source network entity 11 to target network entity 13.

For example, in an aspect, DL-DPCH establishing component 21 may establish the DL-DPCH channel concurrent to or contemporaneously with the P-CCPCH demodulating component 23 demodulating the P-CCPCH and deciphering the associated SFN and/or the CFN computation component 24 computing the CFN. Furthermore, in an additional example aspect, synchronization procedure executing component 22 may perform the SyncA procedure parallel to or contemporaneously with the CFN computation component 24 computing the CFN and/or the DL-DPCH reconfiguring component 25 reconfiguring the DL-DPCH. In additional non-limiting examples, any of the components included in handover expediting component 17 may perform their individual functions in a parallel fashion relative to any function performed by any other component. Again, by executing such handover functions contemporaneously, the UE 10 may reduce the time for handover of call 18 from a source cell to a target cell, e.g., from source network entity 11 to target network entity 13, for example, in instances where the UE 10 is unaware of the target cell SFN and/or the UE 10 must establish a DCCH with a target cell, e.g. target network entity 13.

Figure 3:
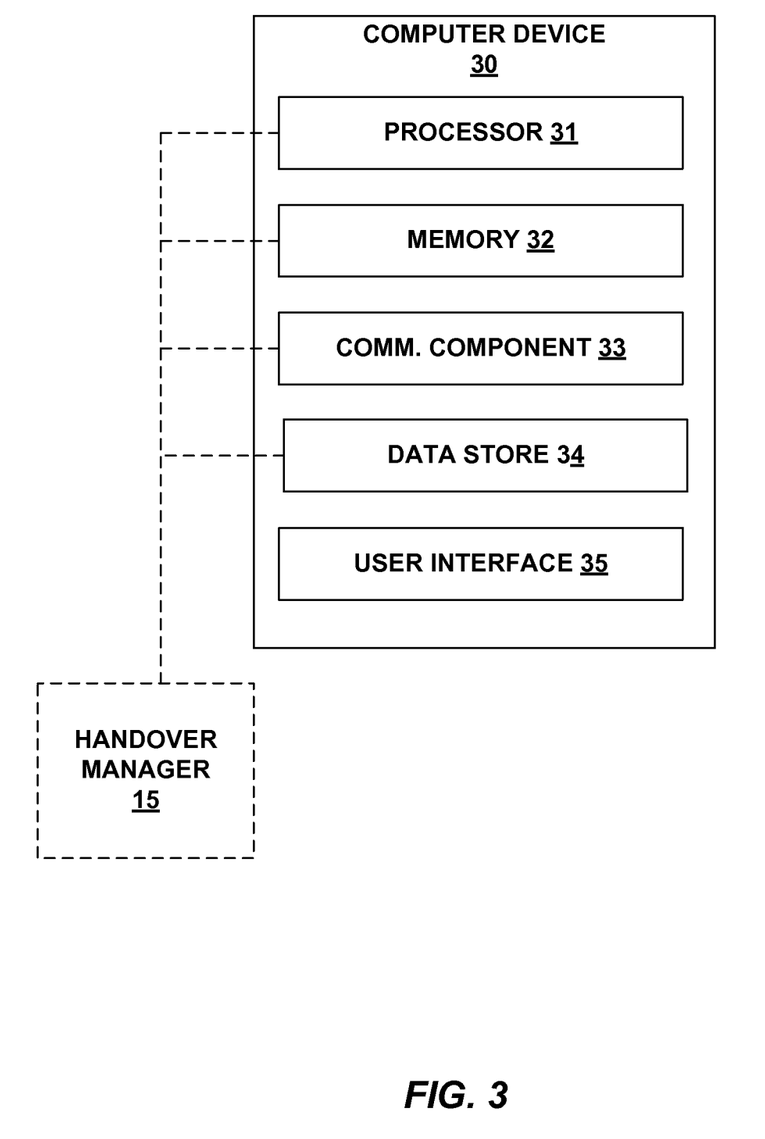
FIG. 3 is a block diagram illustrating an example of a computer device in aspects of the present disclosure.

Referring to FIG. 3, in one aspect, UE 10, for example, including the handover manager 15, or the one or more network entities of FIG. 1, for example, source network entity 11 and/or target network entity 13, may be represented by a specially programmed or configured computer device 30. For example, the special programming or configuring of computer device 30 may be programming or configuring to perform that respective functions described herein for the respective entity, such as for UE 10, source network entity 11, and/or target network entity 13.

Computer device 30 includes a processor 31 specially configured to carry out processing functions associated with one or more of components and functions described herein. Processor 31 can include a single or multiple set of processors or multi-core processors. Moreover, processor 31 can be implemented as an integrated processing system and/or a distributed processing system.

Computer device 30 further includes a memory 32, such as for storing data used herein and/or local versions of applications and/or instructions or code being executed by processor 31, such as to perform the respective functions of the respective entities described herein. Memory 32 can include any type of memory usable by a computer, such as random access memory (RAM), read only memory (ROM), tapes, magnetic discs, optical discs, volatile memory, non-volatile memory, and any combination thereof.

Further, computer device 30 includes a communications component 33 that provides for establishing and maintaining communications with one or more parties utilizing hardware, software, and services as described herein. Communications component 33 may carry communications between components on computer device 30, as well as between computer device 30 and external devices, such as devices located across a communications network and/or devices serially or locally connected to computer device 30. For example, communications component 33 may include one or more buses, and may further include transmit chain components and receive chain components associated with a transmitter and receiver, respectively, or a transceiver, operable for interfacing with external devices.

Additionally, computer device 30 may further include a data store 34, which can be any suitable combination of hardware and/or software, that provides for mass storage of information, databases, and programs employed in connection with aspects described herein. For example, data store 34 may be a data repository for applications not currently being executed by processor 31.

Computer device 30 may additionally include a user interface component 35 operable to receive inputs from a user of computer device 30, and further operable to generate outputs for presentation to the user. User interface component 35 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 35 may include one or more output devices, including but not limited to a display, a speaker, a haptic feedback mechanism, a printer, any other mechanism capable of presenting an output to a user, or any combination thereof. In an additional aspect, a user using the user interface 35 may set one of a first subscription or a second subscription as a dedicated data service (DDS) for the computer device 30.

In a mobile station implementation, such as for UE 10 of FIG. 1, computer device 30 may include handover manager 15, such as in specially programmed computer readable instructions or code, firmware, a processor or other hardware, or some combination thereof. For example, handover manager 15 may be implemented in processor 31, which operates in conjunction with memory 32, communications component 33 and/or data store 34 to implement handover manager 15.

Figure 4:
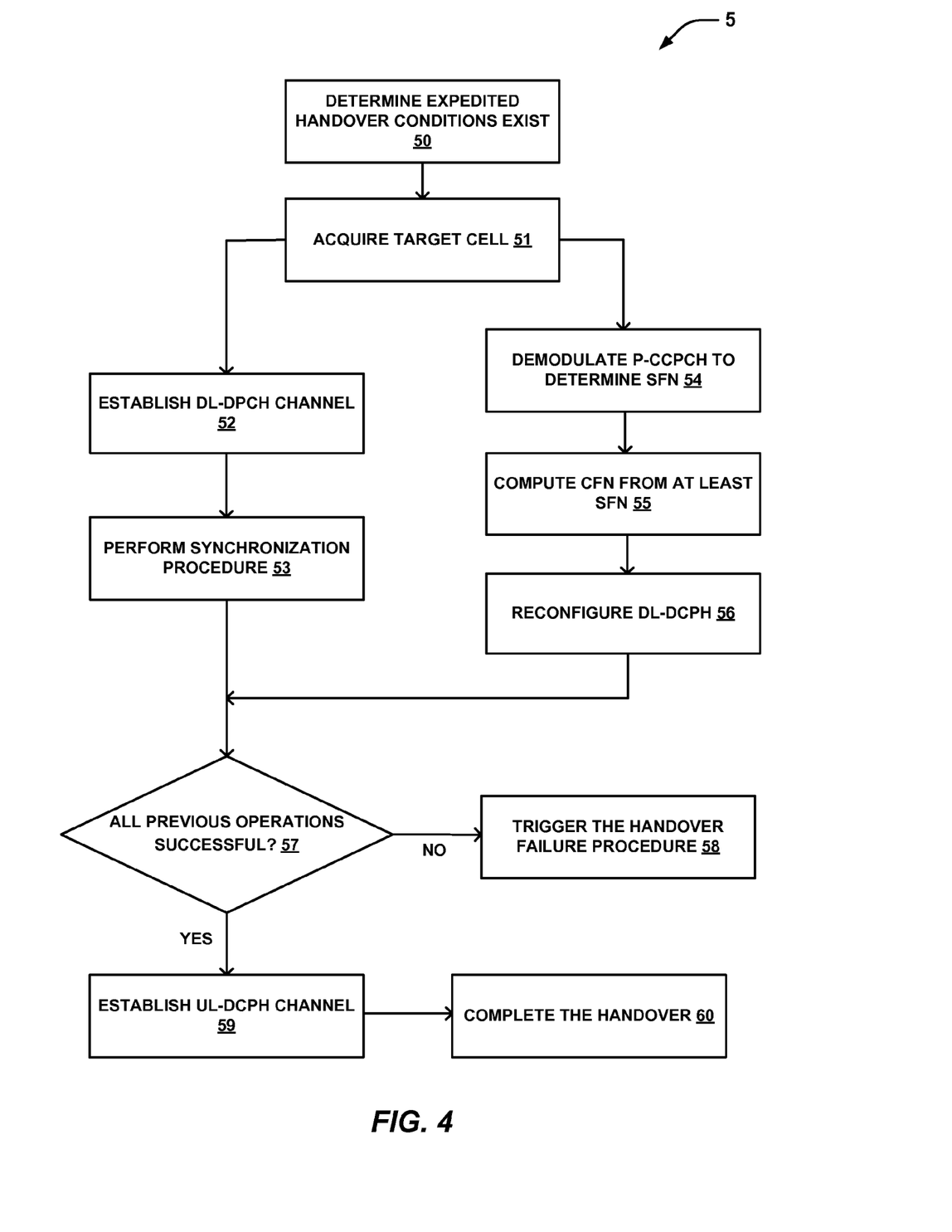
FIG. 4 is a flow diagram illustrating aspects of an example method for expedited handover according to aspects of the present disclosure.

Referring to FIG. 4, example methodologies for improved handover in wireless environments are presented. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In FIG. 4, an aspect of a method 5 for improved handover in wireless environments may include, at block 40, determining that an expedited handover condition exists. For example, in an aspect, UE 10 (FIG. 1) may have an active call 18 with serving network entity 11, and UE 10 may determine that expedited handover conditions exist. For instance, the UE 10 may execute handover determining condition component 16 to determine that call conditions related to serving cell have degraded and/or that a target cell is available and has a sufficient signal strength to quality as a candidate for receiving a handover. In an alternative or additional aspect, a network entity in communication with the UE 10, e.g. serving network entity 11, may inform the UE 10 that an expedited handover is imminent.

Furthermore, at block 51, method 5 may include acquiring a target cell. For example, in an aspect, the UE 10 may execute handover expediting component 17 and/or target cell acquiring component 20 to acquire a target cell, such as target network entity 13.

Thereafter, as illustrated in FIG. 4, method 5 may include contemporaneously performing two or more processes related to handover to the target cell in parallel. For example, at blocks 52 and 54, method 5 may include establishing a downlink dedicated physical control channel (DL-DPCH) contemporaneously with ascertaining a system frame number (SFN) of the target cell, which may include, for example, demodulating the P-CCPCH to determine the SFN of the target cell. For instance, in an aspect, UE 10 may execute DL-DPCH establishing component 21 contemporaneously with P-CCPCH demodulating component 23 to respectively establish the DL-DPCH and determine the SFN. Furthermore, in an aspect, at blocks 53 and 55 and/or 56, method 5 may respectively include establishing a synchronization with the target cell in combination with either or both of calculating a connection frame number (CFN) for a dedicated channel (DCH) transmission and/or reconfiguring a dedicated physical channel (DPCH) based on the calculated CFN. For example, in an aspect, the UE 10 may, for example, execute handover expediting component 17 and/or synchronization procedure executing component 22 to perform a synchronization procedure (e.g. a Sync A procedure) contemporaneously with (1) executing handover expediting component 17 and/or CFN computation component 24 to compute a connection frame number based on the determined SFN, and/or (2) executing handover expediting component 17 and/or DL-DPCH reconfiguring component 25 to reconfigure the DL-DPCH. In other words, as illustrated in FIG. 4, the UE 10 may perform at least one of the operations corresponding to blocks 52 and 53 substantially contemporaneously with at least one of the operations corresponding to blocks 54, 55, and 56. By performing these operations in parallel, the UE 10 may reduce the time required for handover to a target cell.

In an additional aspect, at block 57, method 5 may include determining whether the previous operations were successful. For example, in an aspect, the UE 10 may execute handover expediting component 17 to evaluate a result of the above-noted operations in order to determine whether all previous operations associated with the handover (by non-limiting example, the operations corresponding to blocks 50, 51, 52, 53, 54, 55, and/or 56) have been successfully completed.

In an aspect, at block 59, when method 5 determines that all previous operations were successful, the method may further include establishing an uplink dedicated physical channel (UL-DPCH) subsequent to the downlink synchronization. In an alternative aspect, however, it should be noted that method 5 may include establishing an uplink dedicated physical channel (UL-DPCH) subsequent to the downlink synchronization contemporaneously with one or more of the prior operations, such as contemporaneously with the operations corresponding to blocks 54, 55, and/or 56. In any case, in an aspect, when the UE 10 and/or handover expediting component 17 determines that all previous operations were successful, or contemporaneously with any of the above-noted operations, the UE 10 and/or handover expediting component 17 may execute UL-DPCH establishing component 26 to establish an uplink dedicated physical control channel (UL-DPCH) with the target cell, e.g. target network entity 13. At block 60, method 5 may complete the handover. For example, in an aspect, where the UL-DPCH is successfully established, the UE 10 and/or handover expediting component may complete the handover processing and continue the handed-over call, e.g. call 18, on the target cell, e.g. target network entity 13, which is now the new serving cell for call 18.

Alternatively, at block 58, when method 5 determines that all previous operations were successful, the method may further include triggering a handover failure procedure. For example, in an aspect, where the UE 10 and/or handover expediting component 17 determines that one or more operations have not been completed successfully, the UE 10 and/or handover expediting component 17 can trigger a handover failure procedure, e.g., such as defined in the Technical Specification published by $3^{rd}$ Generation Partnership Project (3GPP).

Figure 5:
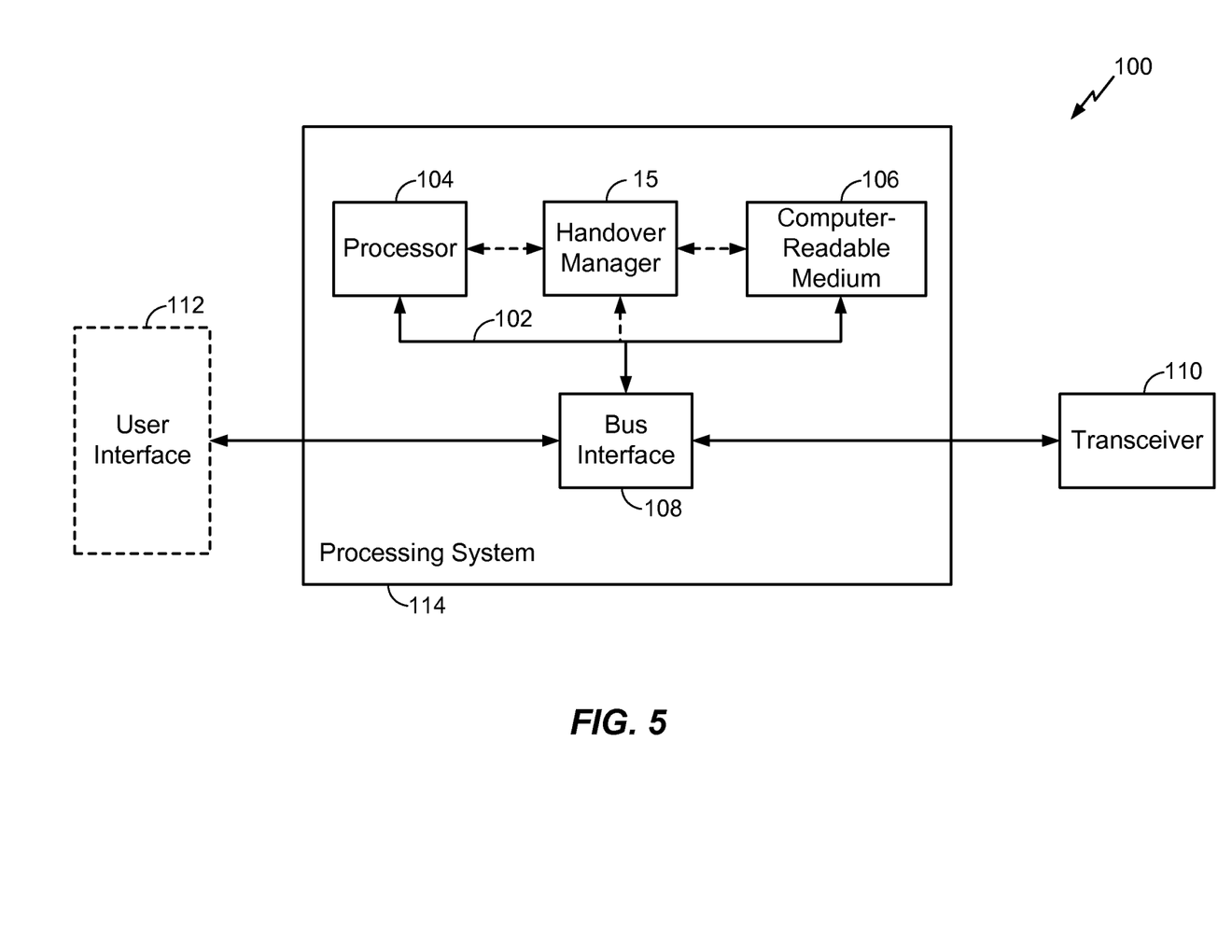
FIG. 5 is a block diagram illustrating an example of a hardware implementation for an apparatus employing a processing system configured according to the aspects described herein.

FIG. 5 is a block diagram illustrating an example of a hardware implementation for an apparatus 100, which may be the same as or included in UE 10 of FIG. 1, employing a processing system 114, for example including the handover manager 15 of FIG. 1, for carrying out aspects of the present disclosure including methods for expedited handover. In this example, the processing system 114 may be implemented with a bus architecture, represented generally by the bus 102, and may be native, for example, to UE 10, source network entity 11, and/or target network entity 13 (FIG. 1). The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software, such as instructions defining handover manager 15, stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. In addition or alternatively, processor 104 may include one or more processor modules to perform the functions of handover manager 15.

Figure 6:
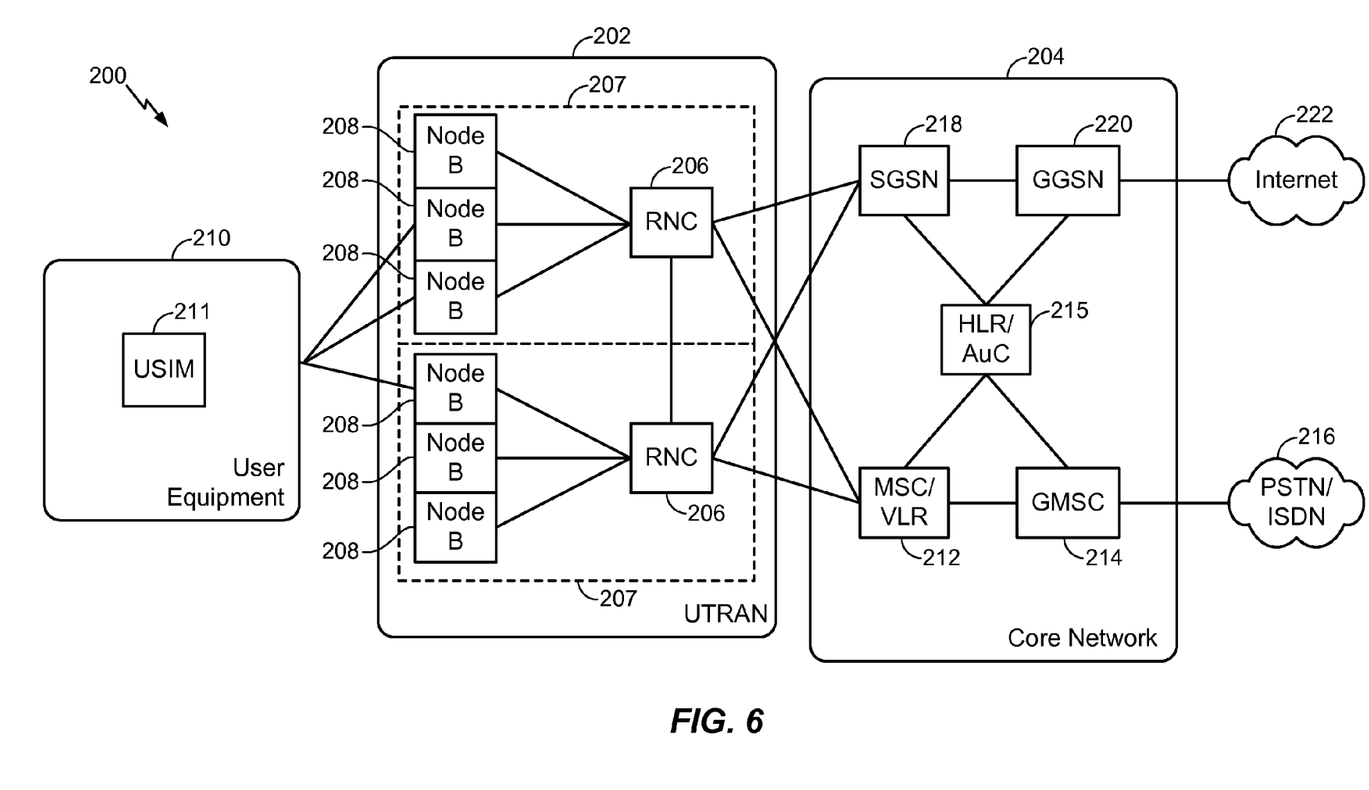
FIG. 6 is a block diagram conceptually illustrating an example of a telecommunications system configured according to the aspects described herein.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a WCDMA air interface, and may include a UE 210 executing an aspect of handover manager 15 of FIG. 1. A UMTS network includes three interacting domains: a Core Network (CN) 204, a UMTS Terrestrial Radio Access Network (UTRAN) 202, and UE 210. In an aspect, as noted, UE 210 may be UE 10 (FIG. 1) and may be configured to perform functions thereof, for example, including the expedited handover actions of handover manager 15. Further, UTRAN 202 may comprise first RAT and/or second RAT network entities, such as source network entity 11 and target network entity 13 (FIG. 1), which in this case may be respective ones of the Node Bs 208. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between UE 210 and Node B 208 may be considered as including a physical (PHY) layer and a medium access control (MAC) layer. Further, communication between UE 210 and RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses, such as UE 210. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UE 210 with packet-based network connectivity. Data packets may be transferred between the GGSN 220 and the UE 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" WCDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a WCDMA air interface, the underlying principles may be equally applicable to a TD-SCDMA air interface.

An HSPA air interface includes a series of enhancements to the 3G/WCDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 208 and/or the UE 210 may have multiple antennas supporting MIMO technology. The use of MIMO technology enables the Node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the Node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
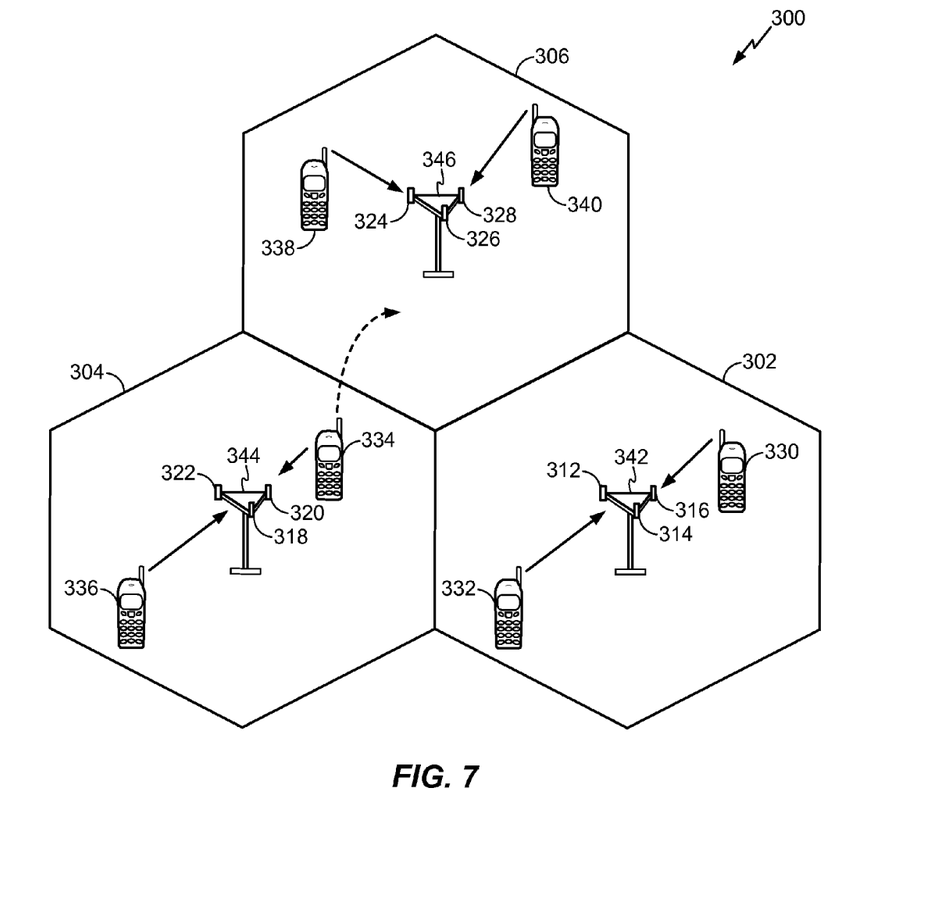
FIG. 7 is a conceptual diagram illustrating an example of an access network configured according to the aspects described herein.

Referring to FIG. 7, an access network 300 in a UTRAN architecture is illustrated and may include one or more UEs configured to include handover manager 15 (FIG. 1) for performing expedited handovers. The multiple access wireless communication system includes multiple cellular regions (cells), including cells 302, 304, and 306, each of which may include one or more sectors. In an aspect, any of cells 302, 304, and/or 306 may utilize the same or different radio access technologies (RATs), and may support handover methods, such as, but not limited to the expedited handover methods described in the present disclosure. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, for example, including handover manager 15 of FIG. 1, which may be in communication with one or more sectors of each cell 302, 304 or 306, and may comprise UE 10 of FIG. 1. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell, the source cell and target cell utilizing the same or different radio access technologies (RATs). Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (e.g., the UTRA cells that are currently assigning a downlink dedicated physical channel DPCH or fractional downlink dedicated physical channel F-DPCH to the UE 334 may constitute the Active Set). In any case, UE 334 may execute handover manager 15 to perform the expedited handover operations described herein.

Further, the modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (WCDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Several aspects of a telecommunications system have been presented with reference to a WCDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software, code, or instructions described herein may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless handover, comprising:
   acquiring a target cell;
   establishing a downlink dedicated physical channel (DL-DPCH) while contemporaneously ascertaining a system frame number (SFN) of the target cell;
   performing a synchronization procedure with the target cell while contemporaneously calculating a connection frame number (CFN) for a dedicated channel (DCH) transmission and reconfiguring the DL-DPCH based on the calculated CFN; and
   establishing an uplink dedicated physical channel (UL-DPCH) subsequent to the synchronization procedure.

2. The method of claim 1, wherein performing the synchronization procedure further comprises performing a Synchronization A procedure according to 3GPP Technical Specification 25.214.

3. The method of claim 1, wherein acquiring the target cell further comprises acquiring a wideband-code division multiple access (W-CDMA) cell, and further comprising handing over a communication session from a non-W-CDMA cell to the W-CDMA cell.

4. The method of claim 1, wherein acquiring the target cell further comprises acquiring a second wideband-code division multiple access (W-CDMA) cell, and further comprising handing over a communication session from a first WCDMA W-CDMA cell to the second W-CDMA cell.

5. The method of claim 1, wherein the acquiring further comprises acquiring the target cell when signal quality of a serving cell has degraded.

6. The method of claim 1, wherein the DL-DPCH allows a user equipment (UE) to receive data from the target cell.

7. The method of claim 1, wherein the calculating further comprises demodulating the SFN of the target cell.

8. The method of claim 7, wherein the SFN of the target cell is broadcast in a broadcast control channel (BCH) by the target cell.

9. An apparatus for wireless communication, comprising:
   means for acquiring a target cell;
   means for establishing a downlink dedicated physical channel (DL-DPCH) while contemporaneously ascertaining a system frame number (SFN) of the target cell;
   means for performing a synchronization procedure with the target cell while contemporaneously calculating a connection frame number (CFN) for a dedicated channel (DCH) transmission and reconfiguring the DL-DPCH based on the calculated CFN; and
   means for establishing an uplink dedicated physical channel (UL-DPCH) subsequent to the synchronization procedure.

10. The apparatus of claim 9, wherein the means for performing the synchronization procedure is further configured to perform a Synchronization A procedure according to 3GPP Technical Specification 25.214.

11. The apparatus of claim 9, wherein the means for acquiring the target cell is further configured to acquire a wideband-code division multiple access (W-CDMA) cell, and further comprising means for handing over a communication session from a non-W-CDMA cell to the W-CDMA cell.

12. The apparatus of claim 9, wherein the means for acquiring the target cell is further configured to acquire a second wideband-code division multiple access (W-CDMA) cell, and further comprising means for handing over a communication session from a first W-CDMA cell to the second W-CDMA cell.

13. The apparatus of claim 9, wherein the means for acquiring is further configured to acquire the target cell when signal quality of a serving cell has degraded.

14. The apparatus of claim 9, wherein the means for the calculating is further configured to demodulate the SFN of the target cell.

15. The apparatus of claim 14, further comprising means for broadcasting the SFN of the target cell in a broadcast control channel (BCH) by the target cell.

16. A non-transitory computer readable medium storing computer executable code, comprising:
   code for acquiring a target cell;
   code for establishing a downlink dedicated physical channel (DL-DPCH) while contemporaneously ascertaining a system frame number (SFN) of the target cell;
   code for performing a synchronization procedure with the target cell while contemporaneously calculating a connection frame number (CFN) for a dedicated channel (DCH) transmission and reconfiguring the DL-DPCH based on the calculated CFN; and
   code for establishing an uplink dedicated physical channel (UL-DPCH) subsequent to the synchronization procedure.

17. The computer readable medium of claim 16, wherein the code for performing the synchronization procedure further comprises code for performing a Synchronization A procedure according to 3GPP Technical Specification 25.214.

18. The computer readable medium of claim 16, wherein the code for acquiring the target cell further comprises code for acquiring a wideband-code division multiple access (W-CDMA) cell, and wherein the computer-readable medium further comprises code for handing over a communication session from a non-non-W-CDMA cell to the W-CDMA cell.

19. The computer readable medium of claim 16, wherein the code for acquiring the target cell further comprises code for acquiring a second wideband-code division multiple access (W-CDMA) cell, and wherein the computer-readable medium further comprises code for handing over a communication session from a first W-CDMA cell to the second W-CDMA cell.

20. The computer readable medium of claim 16, wherein the code for acquiring further comprises code for acquiring the target cell when signal quality of a serving cell had degraded.

21. The computer readable medium of claim 16, wherein the code for establishing the DL-DPCH further comprises a code that allows a user equipment (UE) to receive data from the target cell.

22. The computer readable medium of claim 16, wherein the code for calculating further comprises code for demodulating the SFN of the target cell.

23. An apparatus for wireless communication, comprising: at least one processor; and a memory coupled to the at least one processor, wherein the at least one processor is configured to:
    acquire a target cell;
    establish a downlink dedicated physical channel (DL-DPCH) while contemporaneously ascertaining a system frame number (SFN) of the target cell;
    perform a synchronization procedure with the target cell while contemporaneously calculating a connection frame number (CFN) for a dedicated channel (DCH) transmission and reconfiguring the DL-DPCH based on the calculated CFN; and
    establishing an uplink dedicated physical channel (UL-DPCH) subsequent to the synchronization procedure.

24. The apparatus of claim 23, wherein the at least one processor is further configured to perform the synchronization procedure by performing a Synchronization A procedure according to 3GPP Technical Specification 25.214.

25. The apparatus of claim 23, wherein the target cell comprises a wideband-code division multiple access (W-CDMA) cell, and wherein the at least one processor is further configured to hand over a communication session from a non-W-CDMA cell to the W-CDMA cell.

26. The apparatus of claim 23, wherein the target cell further comprises a second wideband-code division multiple access (W-CDMA) cell, and wherein the at least one processor is further configured to hand over a communication session from a first W-CDMA cell to the second W-CDMA cell.

27. The apparatus of claim 23, wherein the at least one processor is further configured to acquire the target cell when signal quality of a serving cell has degraded.

28. The apparatus of claim 23, wherein the DL-DPCH allows a user equipment (UE) to receive data from the target cell.

29. The apparatus of claim 23, wherein the at least one processor is further configured to demodulate the SFN of the target cell.

30. The apparatus of claim 23, wherein the SFN of the target cell is broadcast in a broadcast control channel (BCH) by the target cell.

\* \* \* \* \*